United States Patent
Manzano et al.

(10) Patent No.: US 10,891,173 B2
(45) Date of Patent: Jan. 12, 2021

(54) DISTRIBUTED ALERT SYSTEM USING ACTOR MODELS

(71) Applicant: salesforce.com, inc., San Francisco, CA (US)

(72) Inventors: Ignacio Agustin Manzano, Buenos Aires (AR); Agustin Lopez Gabeiras, Buenos Aires (AR); Diego Gabriel Larralde, Buenos Aires (AR); Gaston Alberto Lodieu, Buenos Aires (AR); Leandro Luck, Buenos Aires (AR); Álvaro David Gaita, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/398,703

(22) Filed: Apr. 30, 2019

(65) Prior Publication Data
US 2020/0348987 A1    Nov. 5, 2020

(51) Int. Cl.
*G06F 9/54*    (2006.01)

(52) U.S. Cl.
CPC .............. *G06F 9/542* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 2016/0028606 | A1* | 1/2016 | Cole | H04L 43/12 709/224 |
| 2017/0277553 | A1* | 9/2017 | Zada | G06F 9/5061 |
| 2019/0340094 | A1* | 11/2019 | Lu | H04L 41/0618 |
| 2020/0007405 | A1* | 1/2020 | Chitalia | G06F 9/5077 |

* cited by examiner

*Primary Examiner* — Charles E Anya
(74) *Attorney, Agent, or Firm* — Sterne, Kessler, Goldstein & Fox P.L.L.C.

(57) ABSTRACT

Disclosed herein are system, method, and computer program product embodiments for providing a distributed alert system using actor models. The approach includes initializing an alert actor configured to run an alert action. A datapoint related to the alert action is received, and can then be processed at the alert actor against a current status of an alert (such as a running average of prior datapoints) in order to determine a new status of the alert. This allows for a notification to be provided, such as to a system administrator, based on a change in status if needed.

20 Claims, 5 Drawing Sheets

DISTRIBUTED ALERT SYSTEM USING ACTOR MODELS

BACKGROUND

System administrators and other users of computing resources may seek to monitor system events for a variety of reasons. For example, a user may be interested in knowing that a particular system has had high CPU utilization in the past several minutes.

A user may monitor this information using software that polls information, such as CPU utilization information, and logs it to a log file. In the above example, software may log CPU utilization information obtained in set intervals, and could look at the historical information going back several minutes. If, rather than viewing the information in real-time, the user wishes to be notified when the historical information meets some requirement (e.g., signal an alarm if CPU utilization over the past five minutes exceeds 70%), the software will need to check the historical information against this requirement periodically, and notify the user if the requirement is met.

This approach to alert notifications requires not-insignificant resources on a per-alert basis, which complicate scalability of existing approaches to hundreds or thousands of alerts. Accordingly, what is needed is a scalable solution for managing and operating alerts.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
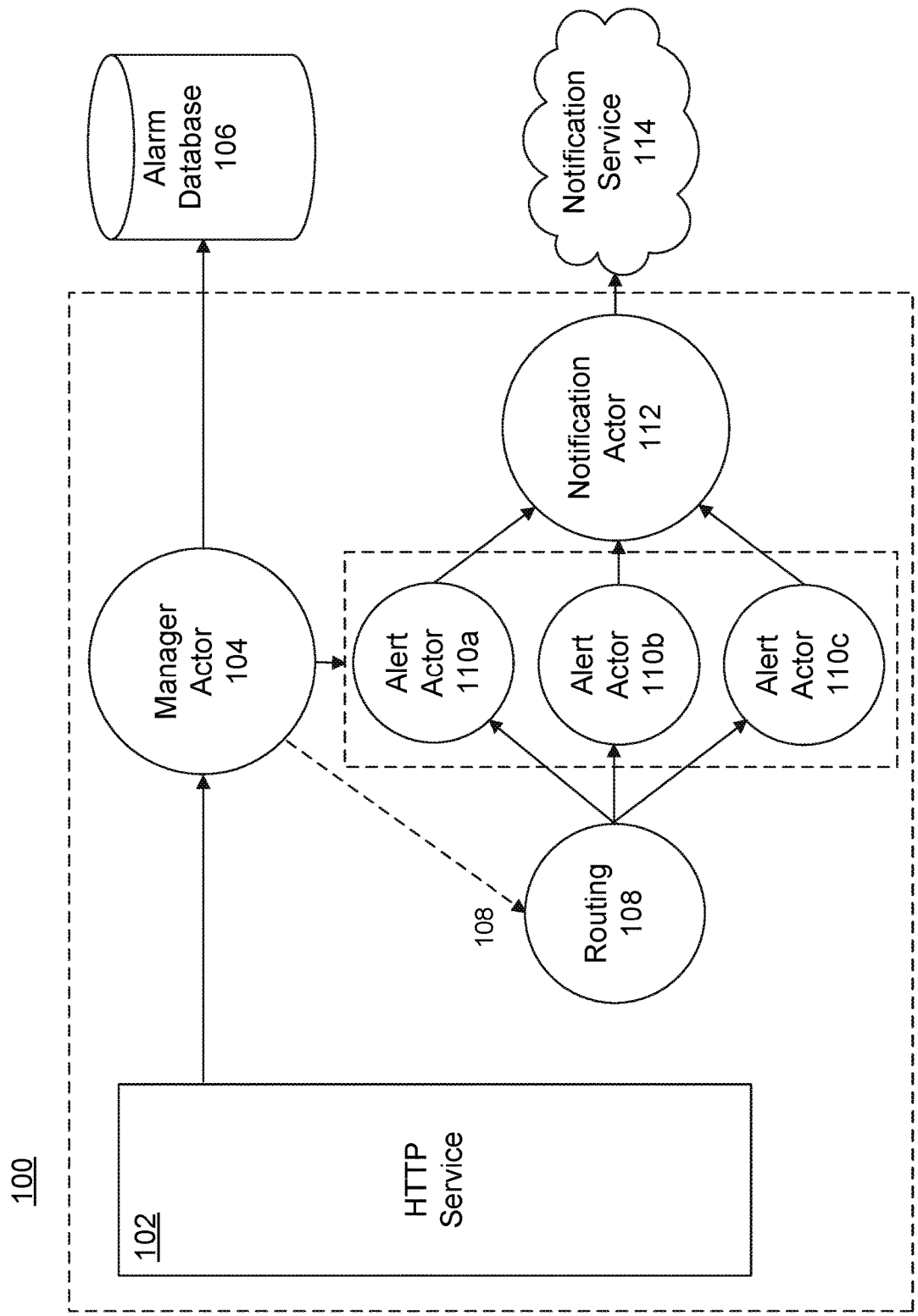
FIG. 1 illustrates a system configured to provide alerts in a scalable manner, in accordance with an embodiment.

Provided herein are system, apparatus, device, method and/or computer program product embodiments, and/or combinations and sub-combinations thereof, for providing a distributed alert system.

Production computing systems need to be monitored by system administrators or other users to ensure that they are operating as expected. Monitoring tools can show an administrator what is currently going on in a system they are managing. For example, monitoring tools may show information about current CPU utilization, memory utilization, reads and writes, cache hits or misses, network utilization, and so on.

This information is typically provided as an instantaneous snapshot of the system. For example, an administrator can see that at the current instant CPU utilization is at 75% for the monitored system. The information may be updated by polling from the system—asking for the current values for the information at regular intervals. For example, a CPU utilization monitor may request the current CPU utilization value each second, and present the administrator with an updated display of the current CPU utilization for the current second in time.

Since a system administrator cannot manually supervise this information every second of every day for every system that they maintain, it is preferable to receive a notification when a monitored parameter, such as CPU utilization, indicates unusual or erratic behavior by the monitored system. For example, CPU utilization spiking to 100% when a new application is started is not unusual. But CPU utilization being over 70% for a rolling five-minute average may be unusual in a given system. In this example, the administrator would want to know that, over the past five minutes, CPU utilization was higher than 70% on average. In accordance with an embodiment, the administrator will receive an alert notifying them that the system has met the alarm condition, specifically by way of an action or rule to notify the administrator whenever CPU utilization exceeds 70% for over five minutes.

Two techniques are commonly employed to provide such an alert. The first requires periodically querying historical datapoints to determine whether an alarm condition exists, which requires significant resources to read and write the volume of data. The second requires storing relevant datapoints as a reference, which requires significant resources to process the incoming information quickly. While such resource utilization may be workable for a handful of alarm conditions, reading five minutes worth of CPU utilization datapoints and computing a rolling average from that, as in the first approach, or keeping a computed rolling average and monitoring for the start of a five minute period to watch, as in the second approach, is costly to scale to hundreds or thousands of alarm conditions.

In accordance with an embodiment, the system administrator may operate a multi-tenant system which needs to be monitored. However, each tenant may themselves wish to monitor system performance for their slice of the overall system (or the system administrator for the overall system may wish to monitor the behavior of individual tenant slices). The number of alarm conditions that need to be monitored to potentially trigger an alert notification skyrockets in such a multi-tenant system, and regular polling and testing as above becomes impracticable.

In an embodiment, scaling such a system can be accomplished through the use of a distributed (and concurrent) alert system. In non-limiting embodiments described herein, processing of alarm conditions in order to generate alerts is handled by "actors." The actor model in computer science is a mathematical model of concurrent computation that treats actors as the universal primitives of concurrent computation. In response to a message that it receives, an actor can, for example, make local decisions, create more actors, send more messages, and determine how to respond to the next message received. Actors may modify their own private state, but can only affect each other through messages (avoiding the need for any locks in concurrent processing). References to an "actor" or "actors" throughout is understood in this context.

FIG. 1 illustrates a system 100 configured to provide alerts in a scalable manner, in accordance with an embodiment. HTTP service 102 is configured to provide an interface to the system 100, in accordance with an embodiment. By way of non-limiting example, a system administrator may contact HTTP service 102 with a request to create an alarm, to modify an alarm, or to delete an alarm. HTTP service 102 can provide a web interface for accomplishing these interactions.

HTTP service 102 can also serve as the ingestion point into system 100 of raw data, in the form of individual datapoints, that are being monitored for alarm conditions. These datapoints can be sent to HTTP service 102 individually or as a batch.

One skilled in the relevant arts will appreciate that HTTP service 102 is described, by way of convenience and not limitation, specifically as providing a web server for these interactions. However, any sort of service that allows interaction with the system, together with or separate from a service that provides the ability to feed datapoints to system 100, may be used. In a non-limiting example, the HTTP service 102 is provided by way of Akka HTTP, which is a toolkit for providing and consuming HTTP-based services using Akka actors and Akka streams.

When HTTP service 102 receives requests to create, modify, or delete alarms, the service notifies a manager actor 104, in accordance with an embodiment. Manager actor 104 handles configuration of the operation of system 100 and ensures that alerts are being handled. One skilled in the relevant arts will appreciate that manager actor 104 is shown as a single actor, but its operations may be distributed and performed concurrently if desired. However, for the purposes of simplicity, manager actor 104 is shown as a monolithic entity performing all manager actor 104 related operations.

In the first of its two major roles, manager actor 104 handles configuration of the operation of system 100. This includes, for example, receiving a request from HTTP service 102 for the creation of a particular alarm. In accordance with an embodiment, an alarm is specified by way of an action to take in response to a certain condition. Referring to an earlier example, the alarm may require that a system administrator be notified (e.g., by email, SMS message, etc.) when CPU utilization is over 70% for five minutes. This alarm is provided by way of a certain metric (CPU utilization) with a function (rolling average in a period of five minutes) to determine if it meets a certain condition (>70%).

One skilled in the relevant arts will recognize that many alarms may be defined as a function of these elements, as well as other elements and combinations thereof. While CPU utilization is provided as an example metric for the alarm, any metric provided to HTTP service 102 (such as memory utilization, reads and writes, cache hits or misses, network utilization, and so on) may be used as the metric. Likewise, the function performed on this metric includes the average as described above, but may also include functions such as a sum, count, min, max, median, or other functions over the metric or metrics. And the condition to be satisfied may include over (>), under (<), no value, within range, outside range, and other conditions understood by persons skilled in the relevant arts that can be assessed against the result of the function or functions performed on the metric or metrics.

Together, one or more functions, conditions, and metrics specify an alarm. Manager actor 104 receives instructions to create alarms from HTTP service 102 specified in a manner where such parameters are understood, in accordance with an embodiment. Manager actor 104 may create and store configuration data that includes these alarms, in order to ensure that the alarms persist across instances of system 104, even if manager actor 104 is stopped. By way of non-limiting example, manager actor 104 may store configuration information to an alarm database 106. Conversely, when system 100 is initiated, manager actor may read configuration information from alarm database 106.

In the second of its two major roles, manager actor 104 ensures that alerts are being handled. Principally, this role requires the manager actor 104 to manage alert actors, such as alert actors 110a-110c (collectively, alert actors 110). This role may include, by way of non-limiting example, the creation of alert actors 110, the assignment of alarms to alert actors 110, stopping alert actors 110, and supervision of alert actors 110. Manager actor 104 may also interface with routing module 108 to ensure that datapoints are routed to the appropriate alert actors 110. This behavior of the manager actor 104 is best further described by way of the operation of the routing module 108 and the alert actors 110.

HTTP service 102, as described above, may receive datapoints useful in monitoring system conditions. These datapoints relate to the metrics described above in the specification of an alarm, but also typically carry with them some sort of time information (e.g., a timestamp) indicating a moment in time at which the metric was captured. For example, if monitoring CPU utilization, a specific datapoint may specify (CPU %, $t_x$), or in other words CPU % utilization at time $t_x$.

Routing module 108 obtains these datapoints from HTTP service 102 and provides them to alert actors 110, in accordance with an embodiment. A person skilled in the relevant arts will appreciate that routing module 108 may be implemented in a number of different manners and positions within system 100, and is shown separate from HTTP service 102 by way of clarity and not limitation. These datapoints may be provided to routing module 108 individually or collected together into a batch.

Routing module 108 then streams datapoints to alert actors 110, in accordance with an embodiment. In an exemplary non-limiting embodiment, these streams are implemented as Akka streams, which allow for certain guarantees in the delivery of the datapoints to alert actors 110. One skilled in the relevant arts will appreciate that other mechanisms for delivering (streaming or otherwise) datapoints from HTTP service 102 to alert actors 110 may be used.

As previously mentioned, one of the responsibilities of manager actor 104, in accordance with an embodiment, is to configure routing module 108 to route datapoints to alert actors 110. As will be described further below, each alert actor 110, such as alert actor 110a, is tasked with carrying out alerts for a given alarm condition. As described above, the alarm condition relies on certain metrics, which are obtained as the datapoints.

However, not all datapoints will be relevant to all alarms. In order to minimize communication overhead, only those datapoints needed to address the metrics of an alarm condition are provided to a given alert actor (e.g., alert actor 110a). For example, if alert actor 110a is tasked with providing alerts for the CPU % utilization >70% for five minutes alarm condition, then alert actor 110a will need to receive messages with CPU % utilization (and corresponding time values) in order to carry out its function. But alert actor 110a would not need to receive any other datapoints (e.g., memory utilization), although other alert actors 110b and 110c may be responsible for handling such metrics.

In order to streamline this messaging, routing module 108 may know (e.g., through configuration information provided by manager actor 104) which alert actors 110 require which datapoints. Routing module would then deliver (with a stream or other messaging) those datapoints to only those alert actors 110. Such configuration information may be provided to routing module 108 as a subscription.

Turning to alert actors 110, each alert actor (e.g., 110a-110c in the figure, but one skilled in the relevant arts will appreciate that any number of alert actors may be used) is created with a particular alarm condition for processing, in accordance with an embodiment. One skilled in the relevant arts will appreciate that multiple alert actors 110 may be instantiated with the ability to handle a same particular alarm condition as another (for, e.g., redundancy purposes), but for the purposes of clarity of discussion only one alert actor 110 is provided per alarm condition in example embodiments.

Manager actor 104 ensures that there is an alert actor 110 operating on each active alarm condition. If not, such as in the case where an alert actor 110a encountered an error and unexpectedly terminated, manager actor 104 will instantiate a new alert actor 110 and assign it the corresponding alarm condition.

Each alert actor 110 is able to efficiently perform its alarm monitoring function, compared to prior solutions, because datapoints do not need to be stored (or read from storage), and do not require extensive calculations. An alarm condition is detected by a corresponding alert actor, such as alert actor 110a, through the implementation of an alert action (or alert rule). The alert action provides implementation code (e.g., in the form of a rule) that tests the alarm. For example, alert actor 110a includes an alert action that resolves the one or more functions, conditions, and metrics that specify the alarm.

Figure 2:
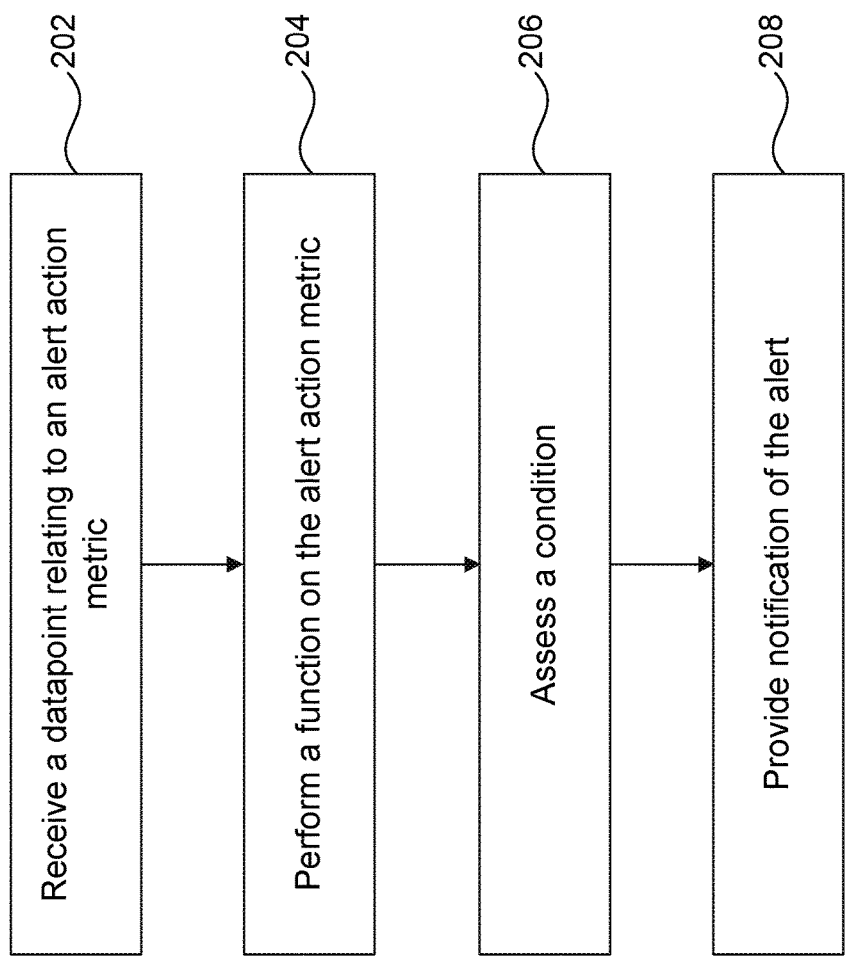
FIG. 2 is a flowchart illustrating steps by which an alert actor resolves an alarm, in accordance with an embodiment.

The alert action needs only the current datapoint it receives from the routing module. Alert actor 110a applies the datapoint as the metric in the alert action to resolve the alert action. FIG. 2 is a flowchart 200 illustrating steps by which an alert actor, such as alert actor 110a, resolves an alarm, in accordance with an embodiment.

At step 202, the alert actor 110a receives a datapoint relating to an alert action metric. For example, in calculating the CPU % utilization, the alert actor 110a receives a datapoint (90%, $t_x$), indicating that CPU % utilization is at 90% at time $t_x$. At step 204, the alert actor 110a performs a function on the metric. Continuing the example, datapoint (90%, $t_x$) is averaged against the computed five minute moving average of previous datapoints. The previous datapoints are not stored nor accessed—in prior iterations, they were also used to compute the moving average.

At step 206, alert actor 110a assesses a condition. Continuing the example again, alert actor 110a determines whether the moving average of CPU % utilization is above 80%. And if so, at step 208, a notification of the alarm condition (an alert) is provided, indicating whether or not the condition has been met.

In this regard, alert actors 110 can be treated as stateless. No information needs to be stored, not even its current alarm status (as it can simply provide a notification each time the condition is met). If an alert actor 110a is terminated for any reason in this embodiment, some information is lost (e.g., the moving average in the above example), but is readily rebuilt going forward.

Alert actions may also be created such that they cancel an alert if a certain condition is true. These may be implemented as separate alert actions performed by separate alert actors 110 from those implementing the alert action to trigger the alert in the first instance, or, more typically, may be implemented as part of the same alert action using stateful alert actors 110.

Returning to FIG. 1, each alert actor provides alerts to notification actor 112, in accordance with an embodiment. Notification actor 112 is responsible for determining whether there has been a state change in the alert, and can send this information to the system administrator over a notification service 114. By way of non-limiting example, notification service 114 may provide such notification by email, SMS, direct message, or other means that will be readily apparent to persons skilled in the relevant arts.

Figure 3:
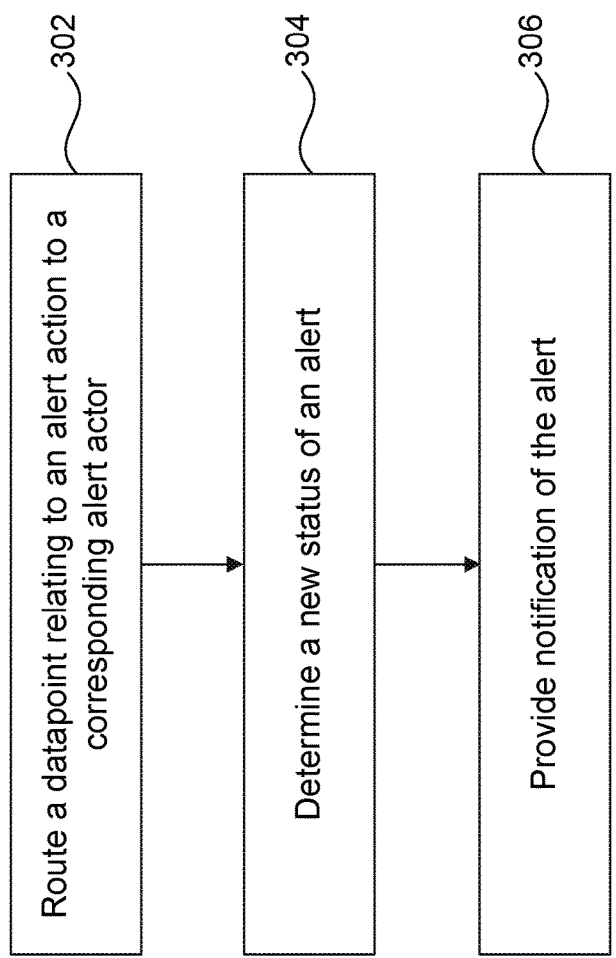
FIG. 3 is a flowchart illustrating operation of a datapoint alert process, in accordance with an embodiment.

FIG. 3 is a flowchart 300 illustrating the operation of the datapoint alert process, in accordance with an embodiment. At step 302, a datapoint relating to an alert action is routed to a corresponding alert actor 110, in accordance with an embodiment. This routing is handled, for example, by routing module 108 using a stream. At step 304, a new status of an alert is determined through processing by alert actors 110 of the datapoint. And at step 306, a notification of the alert is provided by notification actor 112.

Figure 4:
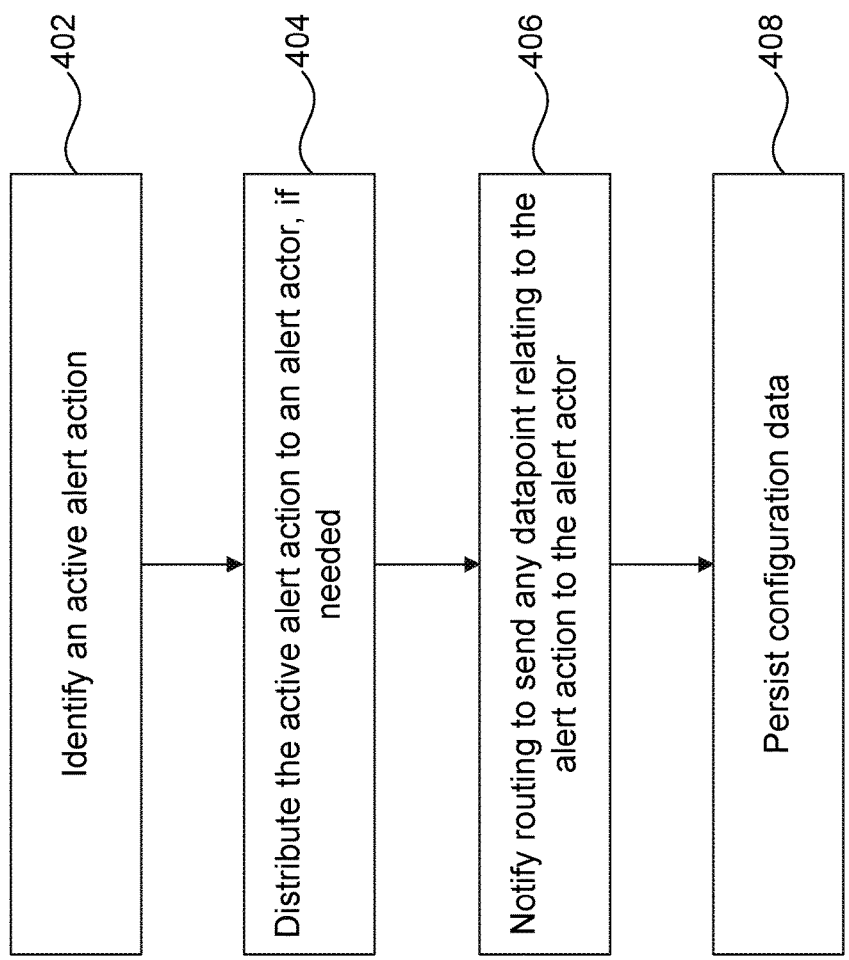
FIG. 4 is a flowchart 400 illustrating operation of a manager actor in accordance with an embodiment.

FIG. 4 is a flowchart 400 illustrating the operation of a manager actor, such as manager actor 104, in accordance with an embodiment. The manager actor 104 identifies an active alert action at step 402. This can be, for example, a new or modified alert action being received from a system administrator via HTTP service 102, or an alert action corresponding to an alarm read from alarm database 106.

At step 404, the active alert action is distributed to an actor if needed, in accordance with an embodiment. Manager actor 104 tracks whether the alert action has been assigned to an alert actor 110, and ensures that it is assigned if not. Manager actor 104 may also monitor the health of alert actors 110, and assign the alert action to a new alert actor 110 if there are any issues with the currently responsible alert actor 110.

At step 406, the manager actor 104 notifies routing module 108 of a subscription, in accordance with an embodiment. This subscription (or similar manner of identifying this need) informs the routing module 108 that a certain type of datapoint should be sent (via message or stream) to a particular alert actor, which needs the datapoint as a metric to resolve its assigned alert action. And at step 408, the manager actor 104 saves any changes to configuration data in persistent storage in order to ensure future consistency.

An added benefit of this implementation is that the entire service can be scaled horizontally, with more than one instance of the system operating simultaneously. This can provide redundancy in the event of issues with one of the systems. Moreover, crash recovery is much the same as spinning-off another instance of the service. The actors (manager, alert, and notification) can all be created from only the data in the alarm database 106, and will be fully operational upon receipt of sufficient datapoints from HTTP service 102 upon reinitialization.

Figure 5:
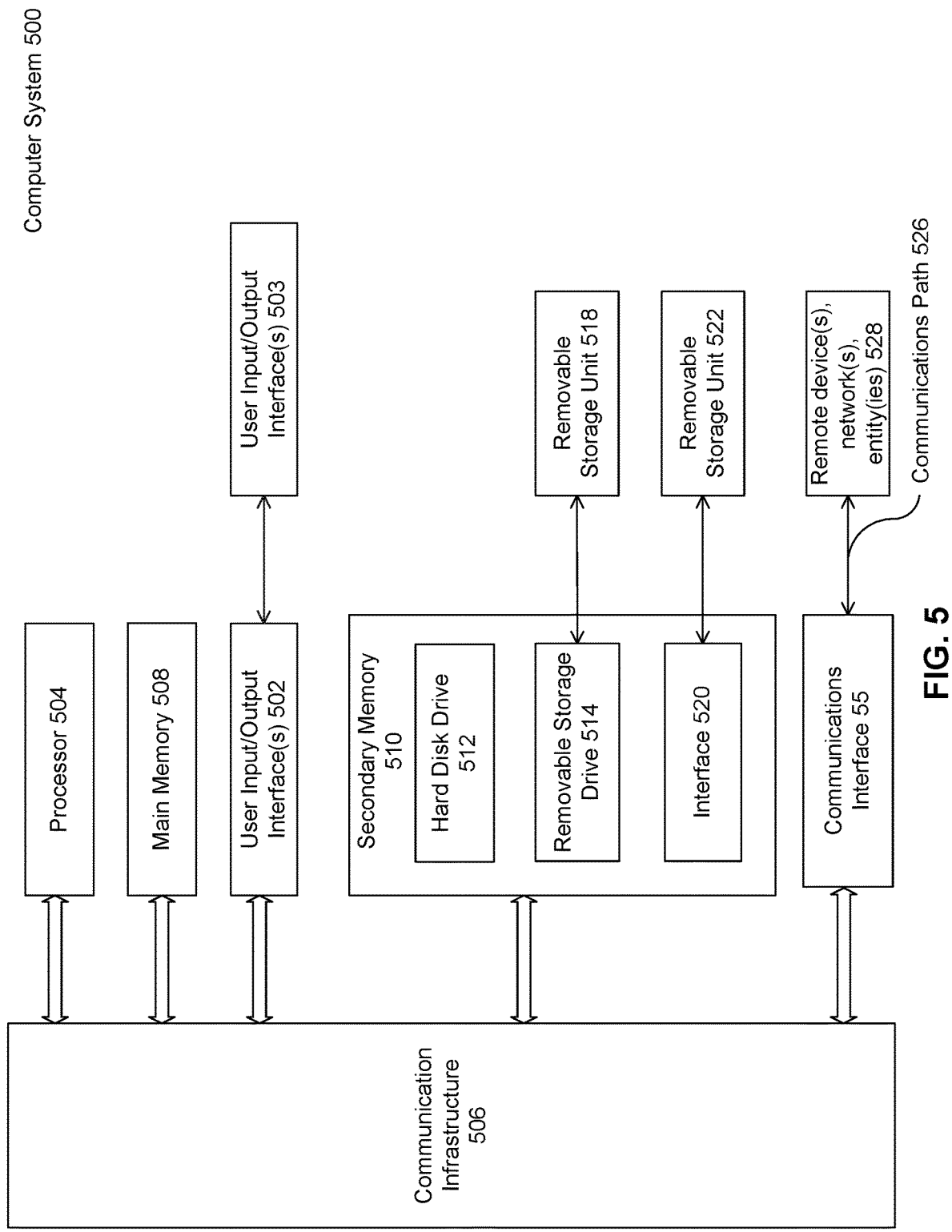
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for monitoring computer resource usage, comprising:
    obtaining, by a manager actor executing on one or more computing devices and via an HTTP service, a request to create a first alarm, wherein the first alarm is associated with a first alert action and usage of a first computing resource;
    creating, by the manager actor and in response to the request, a first alert actor configured to run the first alert action associated with the first alarm and usage of the first computing resource;
    creating, by the manager actor, a second alert actor configured to run a second alert action associated with a second alarm and usage of a second computing resource;
    notifying, by the manager actor, a routing module of a first subscription for the first alert actor and of a second subscription for the second alert actor;
    obtaining, by the HTTP service, a first datapoint related to the first alert action and a second datapoint related to the second alert action;
    streaming, by the routing module executing on the one or more computing devices, the first datapoint related to the first alert action to the first alert actor based on the first subscription;
    streaming, by the routing module, the second datapoint related to the second alert action to the second alert actor based on the second subscription,
    wherein the first datapoint and the second datapoint relate to usage of the first computer resource and the second computer resource, respectively;
    determining, by the first alert actor, a new status of a first alert by processing the first datapoint against the first alert action and providing the new status of the first alert to a notification actor;
    determining, by the second alert actor, a new status of a second alert by processing the second datapoint against the second alert action and providing the new status of the second alert to the notification actor;
    providing, by the notification actor, a notification of the first alert to a system administrator based on a change between a current status of the first alert and the new status of the first alert; and
    providing, by the notification actor, a notification of the second alert based on a change between a current status of the second alert and the new status of the second alert.

2. The method of claim 1, wherein:
    the manager actor executing on the one or more computing devices stores configuration data to a persistent storage,
    the configuration data includes the first alert action corresponding to the first alarm, and
    the first actor is created, by the manager actor executing on the one or more computing devices, in response to determining that the first alert action has not been assigned.

3. The method of claim 1, wherein the first alert action comprises a metric, a function, and a condition, and wherein receiving the first datapoint related to the first alert action comprises:
    receiving the first datapoint for use as the metric.

4. The method of claim 3, wherein the function is a moving average.

5. The method of claim 4, wherein the condition specifies that the moving average is above a threshold for a defined period of time.

6. The method of claim 4, wherein the first alert actor computes the moving average without accessing a previous datapoint.

7. The method of claim 1, wherein the first datapoint and the second datapoints are streamed by the routing module using Akka streams.

8. The method of claim 1, wherein the manager actor, the first actor, and the second actor are the universal primitives of concurrent computation that avoid the need for locks in concurrent processing.

9. A system for monitoring computer resource usage, comprising:
    a memory configured to store operations; and
    one or more processors configured to perform the operations, the operations comprising:
        executing a manager actor to:
            obtain, via an HTTP service, a request to create a first alarm, wherein the first alarm is associated with a first alert action and usage of a first computing resource;
            create, in response to the request, a first alert actor configured to run the first alert action associated with the first alarm and usage of the first computing resource;
            create a second alert actor configured to run a second alert action associated with a second alarm and usage of a second computing resource; and
            notify a routing module of a first subscription for the first alert actor and of a second subscription for the second alert actor;
        executing the HTTP service to obtain a first datapoint related to the first alert action and a second datapoint related to the second alert action;
        executing the routing module to stream:
            a first datapoint related to the first alert action to the first alert actor based on the first subscription; and
            a second datapoint related to the second alert action to the second alert actor based on the second subscription, wherein the first datapoint and the second datapoint relate to usage of the first computer resource and the second computer resource, respectively;

executing the first alert actor to determine a new status of a first alert by processing the first datapoint against the first alert action and to provide the new status of the first alert to a notification actor;

executing the second alert actor to determine a new status of a second alert by processing the second datapoint against the second alert action and to provide the new status of the second alert to the notification actor; and executing the notification actor to:
provide a notification of the first alert to a system administrator based on a change between a current status of the first alert and the new status of the first alert; and
provide a notification of the second alert based on a change between a current status of the second alert and the new status of the second alert.

10. The system of claim 9, wherein:
the manager actor stores configuration data to a persistent storage,
the configuration data includes the first alert action corresponding to the first alarm, and
the first actor is created in response to determining that the first alert action has not been assigned.

11. The system of claim 9, wherein the first alert action comprises a metric, a function, and a condition, and wherein receiving the first datapoint related to the first alert action comprises:
receiving the first datapoint for use as the metric.

12. The system of claim 11, wherein the function comprises a moving average, and wherein the first alert actor computes the moving average without accessing a previous datapoint.

13. The system of claim 9, wherein the first datapoint and the second datapoints are streamed by the routing module using Akka streams.

14. The system of claim 9, wherein the manager actor, the first actor, and the second actor are the universal primitives of concurrent computation that avoid the need for locks in concurrent processing.

15. A non-transitory computer readable storage device having instructions stored thereon, execution of which, by one or more processing devices, causes the one or more processing devices to perform operations comprising:
executing a manager actor to:
obtain, via an HTTP service, a request to create a first alarm, wherein the first alarm is associated with a first alert action and usage of a first computing resource;
create, in response to the request, a first alert actor configured to run the alert action associated with the first alarm and usage of the first computing resource; and
create a second alert actor configured to run a second alert action associated with a second alarm and usage of a second computing resource; and notify a routing module of a first subscription for the first alert actor and of a second subscription for the second alert actor;
execute the HTTP service to obtain a first datapoint related to the first alert action and a second datapoint related to the second alert action;
executing the routing module to stream:
a first datapoint related to the first alert action to the first alert actor based on the first subscription; and
a second datapoint related to the second alert action to the second alert actor based on the second subscription,
wherein the first datapoint and the second datapoint relate to usage of the first computer resource and the second computer resource, respectively;
executing the first alert actor to determine a new status of a first alert by processing the first datapoint against the first alert action and to provide the new status of the first alert to a notification actor;
executing the second alert actor to determine a new status of a second alert by processing the second datapoint against the second alert action and to provide the new status of the second assert to the notification actor; and
executing the notification actor to:
provide a notification of the first alert to a system administrator based on a change between a current status of the first alert and the new status of the alert; and
provide a notification of the second alert based on a change between a current status of the second alert and the new status of the second alert.

16. The non-transitory computer readable storage device of claim 15, wherein:
the manager actor stores configuration data to a persistent storage,
the configuration data includes the first alert action corresponding to the first alarm, and
the first actor is created in response to determining that the first alert action has not been assigned.

17. The non-transitory computer readable storage device of claim 15, wherein the first alert action comprises a metric, a function, and a condition, and wherein receiving the first datapoint related to the first alert action comprises:
receiving the first datapoint for use as the metric.

18. The non-transitory computer readable storage device of claim 17, wherein the function comprises a moving average, and wherein the first alert actor computes the moving average without accessing a previous datapoint.

19. The non-transitory computer readable storage device of claim 15, wherein the first datapoint and the second datapoints are streamed by the routing module using Akka streams.

20. The non-transitory computer readable storage device of claim 15, wherein the manager actor, the first actor, and the second actor are the universal primitives of concurrent computation that avoid the need for locks in concurrent processing.

* * * * *